Jan. 2, 1968   N. H. JOHNSON ET AL   3,361,356
AUTOMATIC WATERING CONTROL SYSTEM
Filed Oct. 14, 1965   3 Sheets-Sheet 1
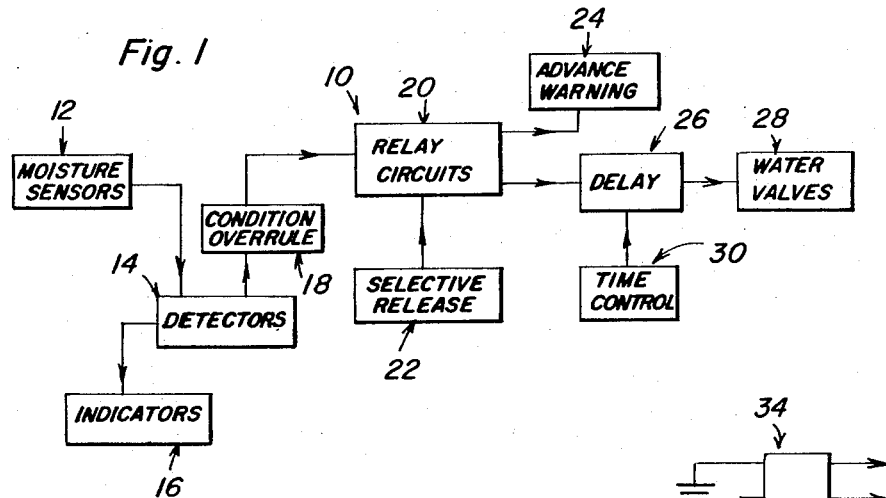
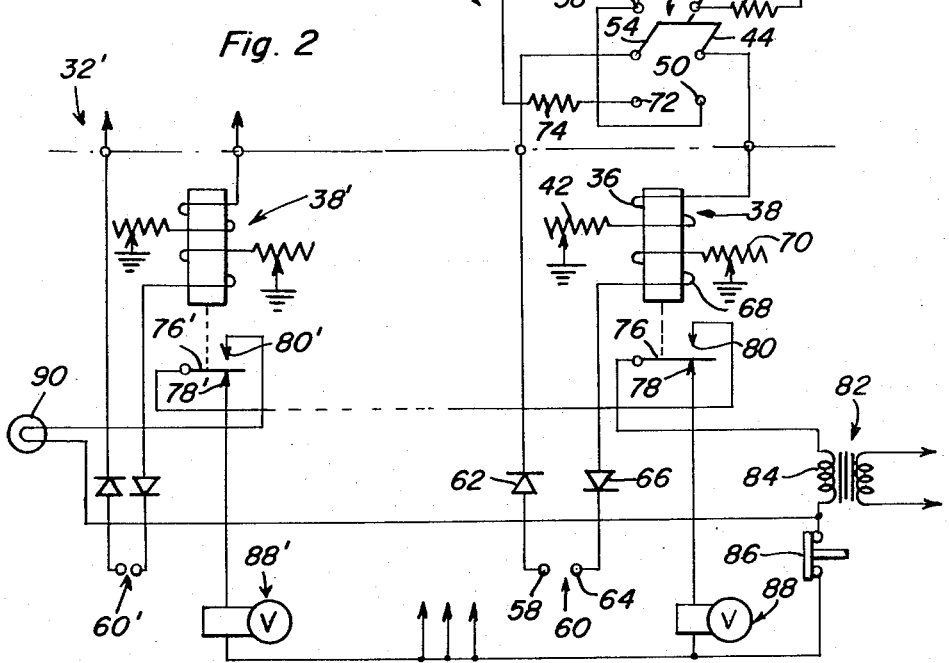
Neal H. Johnson
Harmon J. Halbrook
INVENTORS

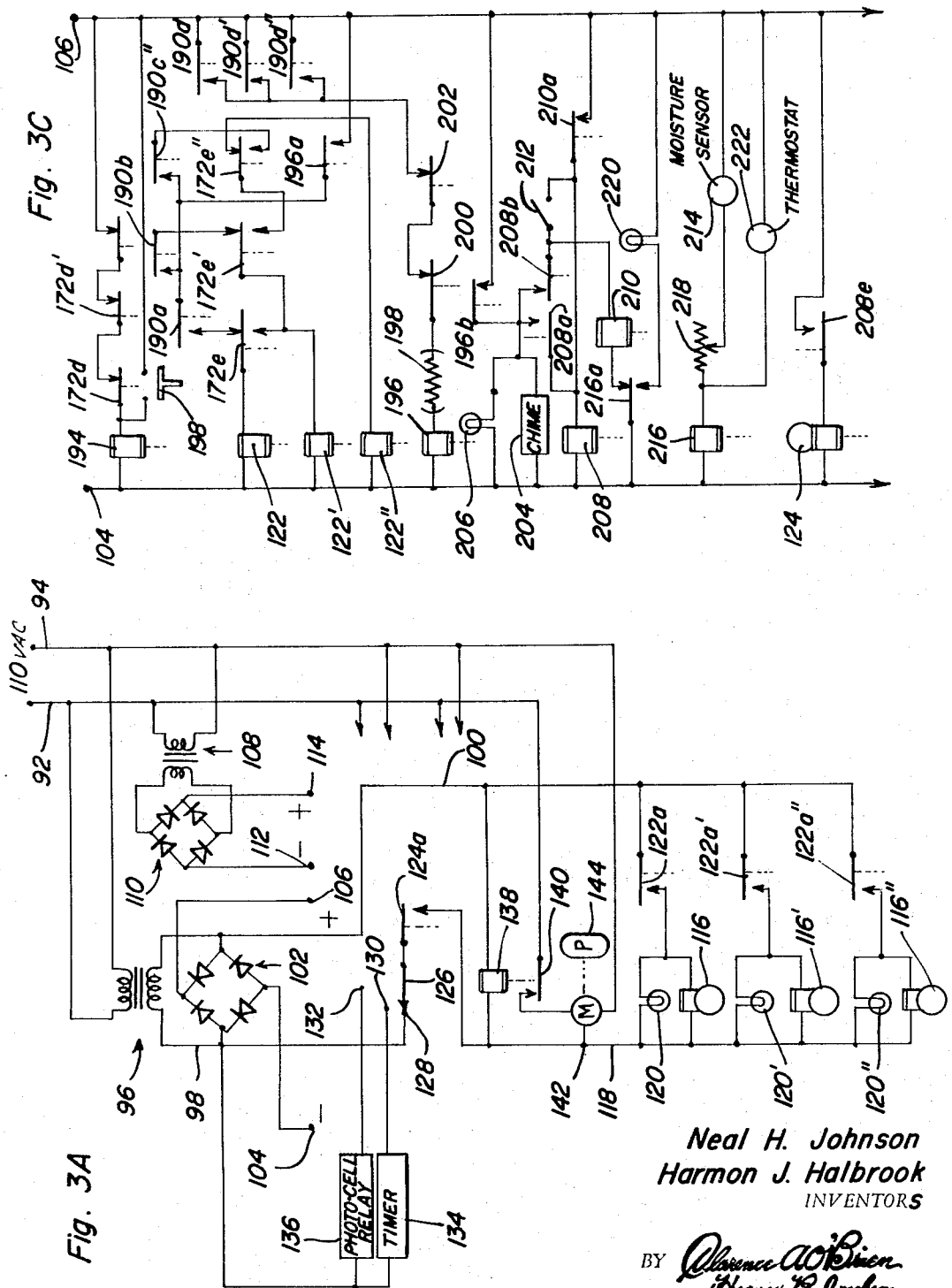

Neal H. Johnson
Harmon J. Halbrook
INVENTORS 3,361,356
AUTOMATIC WATERING CONTROL SYSTEM
Neal H. Johnson, 800 N. Golder St., and Harmon J. Halbrook, 1317 E. 51st St., both of Odessa, Tex. 79760
Filed Oct. 14, 1965, Ser. No. 495,935
15 Claims. (Cl. 239—63)

ABSTRACT OF THE DISCLOSURE

An irrigation control system for a plurality of separate areas respectively serviced by control units interrelated to establish watering periods for each area on demand in accordance with preset priority but without interruption of any watering cycle once initiated in any area except if demand is simultaneously made by all control units. The demand is established by a preset difference in current conducted through a soil current circuit including soil embedded electrodes and a bias winding connected to a source of current. Meters measure the current flow through both the soil current circuit and the bias winding to monitor soil and control unit conditions.

---

This invention relates to irrigation systems and more particularly to an electrically controlled system for regulating the watering of cultivated soil.

A primary object of the present invention is to provide an irrigation control system whereby a plurality of separate cultivated areas may be controllably irrigated in accordance with different watering demands and requirements.

An additional object of the present invention is to provide an electrical control system for watering different areas or zones one at a time and limiting the quantity of water supplied thereto in accordance with the different needs.

A further object of the present invention is to provide a water control system having indicating facilities for signifying the condition of the soil being serviced and the operational condition of the control unit.

Yet another object of the present invention is to provide a control system for watering different areas having facilities for monitoring the operating conditions of the control unit and the moisture conditions of the soil and for adjusting the control unit accordingly.

A still further object is to provide a control system for watering a plurality of areas through which watering priorities may be set.

In accordance with the foregoing objects, the control system of the present invention includes a plurality of control units each of which features a polar relay with opposed windings respectively conducting a bias current and a soil-sensing current reflecting the conductivity and moisture of the soil. The control unit is thereby operative upon demand to initiate a watering cycle. A plurality of such control units are interconnected with each other in such a manner that response to demand will await completion of a watering cycle from a preceding control unit before initiating a watering cycle for the area being serviced by the particular control unit.

Other objects of the present invention include the provision of facilities in association with the water control system for limiting operation thereof to certain times of day and to prevent operation should certain weather conditions prevail. For example, the system will not be operative during rainfall or during freezing temperatures and may be selectively limited to either daytime or night-time hours.

These toegther with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a block diagram schematically illustrating the system of the present invention.

FIGURE 2 is an electrical circuit diagram showing a simplified form of control system in accordance with the present invention.

FIGURES 3a, 3b and 3c are electrical circuit diagrams illustrating a more complex form of control system in accordance with the present invention.

Figure 3B:
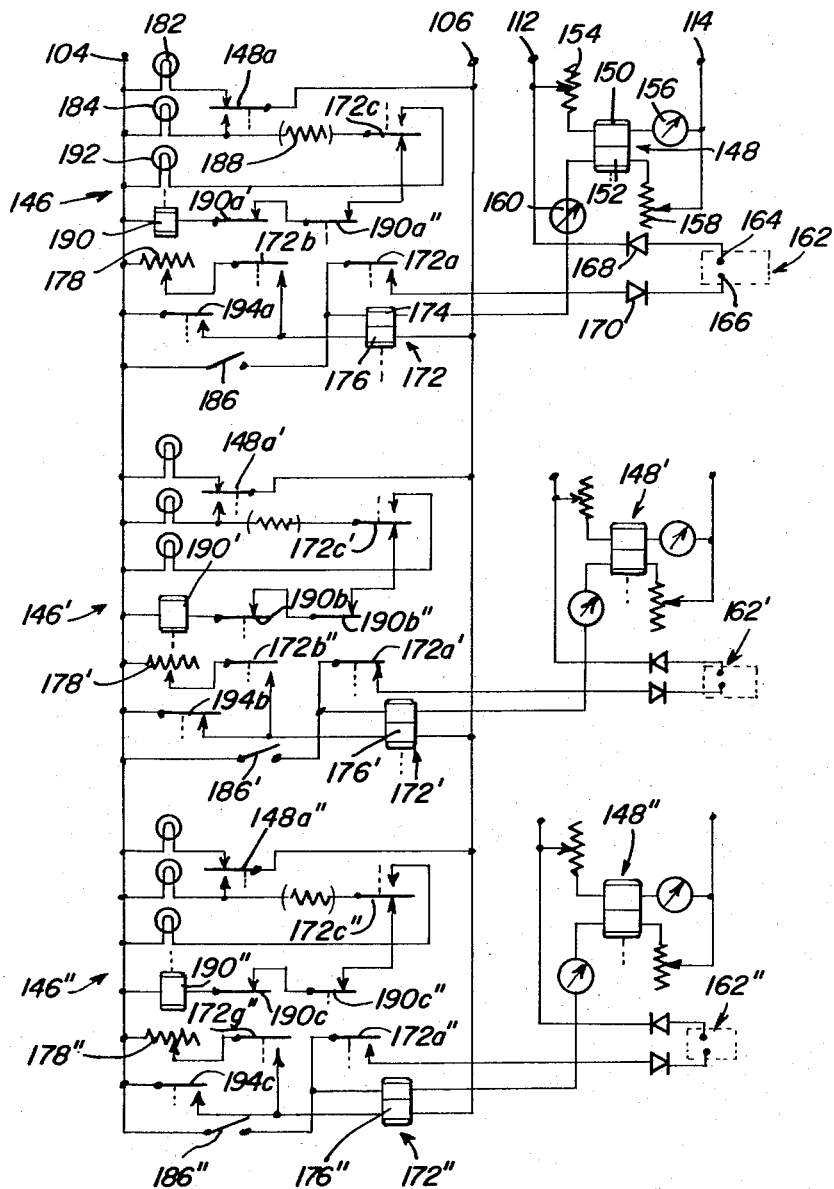

Referring now to the drawings in detail, FIGURE 1 depicts a control system generally referred to by reference numeral 10 adapted to service a plurality of separate areas, each area having associated therewith one of a plurality of moisture sensors 12. The moisture sensors are connected to detector components 14 through which indicators 16 are rendered operative to signify both the condition of the system and the soil. Demands for watering from the respective areas are dispatched by the detector components 14 to the relay circuit components 20, which may be overruled to prevent operation of the system under certain conditions by means of the component 18. Thus, operation of the system may be prevented during certain times of the day or under certain weather conditions. Operation of the relay circuits 20 may be manually or automatically reset by means of the release component 22. The watering operation is initiated by the relay circuits upon receipt of a signal from the detector components 14 through a delay component 26 controlled by the time control 30 so that there will be a period during which an advance warning component 24 may be operative to alert persons of the impending watering operation. Thus, when the watering cycle finally begins, one of a plurality of water valves 28 is opened in order to begin irrigation of one particular area in accordance with its needs.

FIGURE 2 shows one form of system in accordance with the present invention. A plurality of interconnected units 32–32' are interconnected with each other, the number of such units corresponding to the number of discrete areas to be serviced by the system. Each of the units is supplied with D.C. control current from a rectifier component such as the rectifier 34 associated with unit 32 supplying 24 v. D.C. current. The control current is supplied to the primary winding 36 of a detector relay generally referred to by reference numeral 38 through a reversing switch assembly 40. One terminal of the primary winding 36 is connected to ground through a bias adjusting potentiometer 42 while the other terminal thereof is connected to the switch arm 44 of the reversing switch assembly. Thus, when the switch arm 44 engages the contact 46, the primary winding 36 is connected to the output of the rectifier 34 through the meter compensating resistor 48. On the other hand, when the switch arm 44 engages the contact 50, the output of the rectifier 34 is connected to the primary winding 36 through the bias current indicator or milliammeter 52. When the switch arm 44 engages the contact 46 so as to complete an energizing circuit for the primary winding 36 through resistor 48, the switch arm 54 then engages contact 56 so as to connect the ammeter 52 to electrode 58 of detector 60 through diode 62. The other electrode 64 of the detector 60 is connected by the diode 66 to one terminal of the secondary winding 68 associated with the detector relay 38. The other terminal of the secondary winding is connected to ground through a soil current adjusting potentiometer 70. It will therefore be apparent, that when the switch arms 44 and 54 engage the contacts 46 and 56 of the reversing switch assembly 40, the meter 52 will monitor the current conducted through the soil between the electrodes 58 and 64 of the detector 60. When the switch arms 44 and 54 respectively engage the contacts 50 and 72, the output of the rectifier 34 is connected through the meter 52 to the primary winding 36 as aforementioned while the electrode 58 is connected through its diode 62 and the meter compensating resistor 74 to the output of the rectifier 34. Accordingly, the meter 52 will then monitor the bias current conducted through the primary winding 36.

It will be apparent from the foregoing, that when the reversing switch assembly 40 is in either of its operative positions, energizing circuits are completed through both the primary and secondary windings 36 and 68, the relative currents conducted through the windings depending upon the conductivity of the soil between the electrodes 58 and 64 of the detector 60 and the settings of the potentiometers 42 and 70. The conductivity of the soil will of course depend upon the amount of moisture entrained therewithin. Thus, when the soil is dry very little current will flow through the secondary winding 68 and the primary winding 36 will then be effective to displace the relay switch 76 from its normal position shown in FIGURE 2 engaging contact 78 to its actuated position engaging contact 80. On the other hand, when the soil is relatively moist, a lower resistance path is established between the electrodes of the detector 60 so as to conduct a higher soil current through the secondary winding 68 of the detector relay restoring the relay switch 76 to its normal position shown in FIGURE 2. The bias current and soil current respectively conducted through the primary and secondary windings may be monitored by the meter 52 as aforementioned and the resistances of the primary and secondary winding circuits adjusted by the potentiometers 42 and 70 in order to detect any desired moisture condition of the soil.

Current for operating the water valves associated with the system, is supplied from a 110 v. A.C. source of alternating current through a step-down transformer 82. Accordingly, one terminal of the transformer secondary 84 is connected to the relay switch 76 of the detector relay in order to supply 24 v. A.C. current thereto. The other terminal of the transformer secondary 84 is connected through a normally closed switch 86 to all of the solenoid operated watering valve assemblies including the valve assembly 88 associated with the area serviced by the unit 32. Thus, energizing voltage from the transformer secondary 84 is applied across the solenoid operated watering valve 88 through the relay switch 76 associated with unit 32 when it engages the contact 78. When the soil is relatively dry so that the bias current in the primary winding 36 predominates over the soil current in the secondary winding 68, the relay switch 76 will be held in its normal position illustrated in FIGURE 2 engaging the contact 78 in order to energize the solenoid operated watering valve 88. The area serviced by the unit 32 would then be watered until the moisture condition of the soil is such as to increase the soil current within the secondary winding 68 to a point wherein it predominates in order to cause displacement of the relay switch 76 to its actuated position engaging the contact 80.

Each of the other units is similar in arrangement of components to the unit 32 described except that the relay switch associated with each unit following the first unit 32 is connected to the contact of the preceding unit corresponding to the contact 80 described in connection with unit 32. The contact 80' associated with the final unit 32' is connected to one terminal of an indicator lamp 90, the other terminal of the lamp being connected to the transformer secondary 84 in order to complete an energizing circuit through the indicator lamp 90 when all of the relay switches 76–76' are engaged with the relay contacts corresponding to the relay contact 80 of the unit 32 and the contact 80' of the unit 32'. It will therefore be apparent, that when the indicator lamp 90 is illuminated, this will signify that the demands of all of the areas being serviced are satisfied.

It will be appreciated, that each unit may be differently adjusted through its bias and soil current adjusting potentiometers 42 and 70 in order to meet different watering requirements for the respective areas being serviced by the system. It will also be apparent, that the first unit 32 will take precedence over the other units which follow. For example, if an intermediate unit were in a condition energizing its associated solenoid operated watering valve, operation thereof would be interrupted during its watering cycle if a preceding unit detected a dry condition and initiated watering of its associated area. Not until the demands of the areas associated with all of the preceding units were satisfied, would a following unit be operative to energize its associated watering valve to water its associated area. Also, operation of the watering valves may be disabled at any time by opening of the switch 86.

FIGURES 3a, 3b and 3c illustrate a more sophicated system in accordance with the present invention which is also capable of servicing a relatively large number of separate areas. A plurality of interrelated units are utilized corresponding in number to the areas being serviced by the system, each unit having a detector embedded in the soil and a polar detector relay controlled by the moisture in the soil as described in connection with the system of FIGURE 2. The detector relay in accordance with the system of FIGURES 3a, 3b and 3c however, operates a select relay within its unit. The select relay when operated prevents operation of the select relays in the other units in order to insure that one area will be watered at a time by the watering system. The select relay which is operating, will also prepare a conductive path for operating a watering valve that cannot be interrupted until its watering cycle is completed and will also operate other features of the system including time delay devices, and indicator devices. The units of the system may also have associated therewith, group select relays through which the number of areas to be serviced may be expanded. The description which follows, however, refers to three units for the sake of simplicity. It should also be appreciated, that the number of units and areas to be serviced thereby may be increased substantially without impairing the efficiency of the system and without sacrificing any of the operational features thereof.

As shown in FIGURE 3a, the system may be operated from a source of electrical energy such as a 110 v. AC source of alternating current connected to the powerlines 92 and 94. A step-down transformer 96 is connected to the powerlines in order to supply 24 v. AC voltage across the voltage lines 98 and 100. Connected across the voltage lines 98 and 100 is a full wave rectifier 102 having output terminals 104 and 106 supplying a D.C. control voltage such as 24 v. DC. Also connected to the A.C. powerlines 92 and 94, are a plurality of transformers 108 respectively coupled to full wave rectifiers 110 having output terminals 112 and 114. Accordingly, a separate source of D.C. control current will be supplied by each of the rectifiers 110 to the respective area control units. Thus, each area control unit will have associated therewith, a solenoid operated watering valve assembly such as the valve assemblies 116, 116' and 116".

Each of the solenoid operated valve assemblies is connected to an A.C. voltage line 118 in parallel with indicator lamps 120, 120' and 120" respectively. Thus, when each of the valve assemblies is energized upon closing of an associated relay switch 122a, 122a' or 122a", a corresponding indicator lamp will be illuminated. The relay switches 122a, 122a' and 122a" are therefore connected to the A.C. line 100. The voltage line 118 is adapted to be connected to the output of the transformer 96 through the series connected, normally opened, relay switch 124a and selector switch 126. Thus, the line 118 is connected to the voltage line 98 either directly through the selector contact 128 or through the selector contacts 130 and 132 adapted to be engaged by the selector switch 126. A connection to the voltage line 98 is established from the contact 130 through a timer 134 while an electrical connection may alternatively be established from the contact 132 through a photocell relay 136 dependent upon the position of the selector switch 126. It will therefore be apparent, that upon closing of the relay switch 124a, and one of the relay switches 122a, 122a', and 122a'', one of the watering valves 116, 116' or 116'' will be operated either immediately after a preset time interval, or under certain light conditions, dependent upon the setting of the selector switch 126. At the same time, a pump control relay coil 138 will be energized since it is connected across the lines 100 and 118 in order to close a normally open relay switch 140. Closing of the relay switch 140 connects a pump motor 142 across the powerlines 92 and 94 in order to operate pump 144 through which water under the requisite pressure is supplied to the watering valves 116, 116' and 116''.

Referring now to FIGURE 3b, it will be apparent that all of the control units 146, 146' and 146'' are connected in parallel across the D.C. output terminals 104 and 106 of the rectifier 102. Each of the control units is also connected across the output terminals 112 and 144 of one of the plurality of separate rectifiers 110. As described in connection with the system of FIGURE 2, the control unit 146 includes a detector relay 148 having a primary winding 150 and an opposing secondary winding 152. One side of the primary winding 150 is connected to the D.C. terminal 112 through a bias potentiometer 154 while the other side thereof is connected to the D.C. terminal 114 through a milliammeter 156 in order to monitor the bias current conducted through the primary winding. One side of the secondary winding 152 is also connected to the D.C. terminal 114 through a soil current adjusting potentiometer 158 while the other side of the secondary winding 152 is connected to a detector circuit through a monitoring milliammeter 160.

The detector circuit includes the soil embedded detector 162 which mounts the electrodes 164 and 166. The electrode 164 is connected to the D.C. terminal 112 through diode 168 while the electrode 166 is connected through diode 170 and normally closed relay switch 172a to a cycle regulating relay generally referred to by reference numeral 172. The relay 172 includes a pair of windings 174 and 176 which augment each other. The winding 174 is connected through the milliammeter 160 to the secondary winding 152 of the detector relay 148 so that when a predetermined soil current is conducted between the electrodes 164 and 166 of the detector 162, the relay 172 may close its normally open relay switch 172a as well as to actuate the other relay switches 172b, 172c, 172d and 172e (FIGURES 3b and 3c) associated therewith. The value of the soil current which is effective to actuate the relay 172 will depend upon the current conducted through the other winding 176 thereof. Accordingly, the winding 176 is connected across the D.C. terminals 104 and 106 in series with its normally opened relay switch 172b and a current adjusting potentiometer 178 for regulating release of relay 172 to adjust the relative priority of the control unit 146. It will therefore be apparent, that when the area being serviced by the control unit 146 is satisfied and hence is relatively moist, the current conducted through the detector circuit will be sufficient to energize the relay 172. This condition of the relay 172 will correspond to a condition of the detector relay 148 wherein the secondary winding 152 will predominate over the primary winding 150 holding the relay switch 148a associated with the detector relay 148 in the position shown in FIGURE 3b. In such position, the relay switch 148a will connect the indicator lamp 182 across the D.C. voltage terminals 104 and 106 in order to indicate that the demand of the area being serviced by the control unit 146 is satisfied. On the other hand, if the area being serviced by the control unit 146 is dry and watering is called for, the current conducted through the winding 174 in the detector circuit will be of a reduced value such that the relay 172 will release so as to permit the normally opened relay switches 172a and 172b to open. At the same time, the reduced current through the secondary winding 152 of the detector relay 148 will permit the primary winding 150 to predominate in order to actuate the relay switch 148a to deenergize lamp 182 and complete an energizing circuit through the indicator lamp 184 signifying that the area serviced by the control unit is awaiting watering. The relay 172 in its release condition is rendered operative to initiate a watering cycle. At any time however, the control unit 146 may be disabled by closing of the disabling switch 186 directly connecting the D.C. voltage terminal 104 to the winding 174 of the relay 172 bypassing the detector circuit in order to maintain the relay 172 in its completely energized condition.

When the primary winding 150 of the detector relay 148 is operative to actuate the relay switch 148a when watering is called for, a circuit is also completed thereby through the thermistor 188 and the relay switch 172c through a select relay 190. The energizing circuit for the select relay 190 is also established through the normally closed relay switches 198' and 198'' connected in series with the engaged contact of the relay switch 172c so that prior energization of one of the select relays 190' and 190'' of the other control units 146' and 146'' would prevent energization of the select relay 190 of the control unit 146. However, should the select relay 190 be energized before the relays 190' and 190'', is relay switch 190a (FIGURE 3c) would prevent energization of the select relays 190' and 190'' as will be hereafter explained. The thermistor 188 in the energizing circuit of the select relay 190 operates as a timing device in order to insure that there will be no overlap in the energization of the select relays 190, 190' and 190''.

When the demand of the area is satisfied, the relay switch 172c is displaced to the position opposite to that shown in FIGURE 3b completing an energizing circuit through the indicator lamp 192 to signify completion of a watering cycle. At this time, the normally closed relay switch 172d (shown in FIGURE 3c) associated with the relay 172 will open. Accordingly, when the demand of at least one of the control areas is satisfied, the series connected relay switches 172d, 172d' and 172d'' will be ineffective to complete an energizing circuit for the reset relay 194. Energization of the reset relay 194 will close the normally opened relay switch 194a associated therewith within the control unit 146 for example to establish an energizing circuit for the winding 176 of the relay 172 bypassing the potentiometer 178. Thus, all of the relays 172, 172' and 172'' will be reset to a fully energized condition for winding 176 should all of the control units simultaneously dispatch a demand signal so that operation may be initiated at the control unit servicing the driest location. Therefore automatic reset will occur to overrule the sequential operation of the control units in accordance with priorities established by the settings of potentiometers 178, 178' and 178'' which could unreasonably delay watering of a dry area of less importance. The control system may also be manually reset at any time by closing of the manual reset switch 198 bypassing the relay switches 172d, 172d' and 172d''.

The normally opened bypass relay switches 194a, 194b, and 194c respectively associated with the control units are closed by energization of the reset relay coil 194 energized as aforementioned. When one of the select relays 190, 190' or 190'' is energized in response to demand for water from one of the areas being serviced by the system, one of the normally opened relay switches 190d, 190d' and 190d'' shown in FIGURE 3c will be closed in order to establish an energizing circuit across the D.C. voltage terminals for the group select relay coil 196. The relay coil 196 is connected in series with the thermistor 198 and the normally closed relay switches 200 and 202 of other group select relays (not shown) that may be provided in order to expand the number of control units and areas to be serviced. Therefore, if another group had been previously rendered operative, one of the relay switches 200 and 202 would have been opened to prevent operation of the watering valves associated with the group to which control units 146, 146' and 146'' belong. When the group select relay coil 196 is energized, it closes its normally opened relay switch 196a the contact of which is connected to the D.C. terminal 106 so as to complete an energizing circuit through one of valve control relay coils 122, 122' and 122'' which are operative to close the associated, normally opened relay switches 122a, 122a' and 122a'' aforementioned in connection with FIGURE 3a. The relay switch 196a is connected to the relay coil 122 through normally opened relay switch 190a and relay switch 172e so that when a demand for water is made through the control unit 146, the relay 172 will release the relay switch 172e to the position shown in FIGURE 3c while the select relay 190 will close the normally opened relay switch 190a in order to complete an energizing circuit through the relay coil 122. On the other hand, if a demand for watering had been previously received from the control unit 146', the relay coil 122' would be energized and toward this end, it is connected to the relay switch 196a through relay switch 172e' and the normally opened relay switch 190b' which would then be closed by energization of the associated select relay coil 190'. Similarly, the relay coil 122'' is connected to the relay switch 196a through the relay switch 172e'' and the normally opened relay switch 190c'' so that it will be energized when there is a demand for water imposed upon upon the control unit 146''. If control unit 146 should fail to operate in response to a water demand, the relay switch 172e associated with its relay 172 would connect the relay coil 122 to the relay coil 122' so that it may operate in parallel with the relay coil 122' when the control unit 146' receives a demand for water. Similarly, failure of the control unit 146' to operate will cause the relay switch 172e' to connect the relay coil 122' to the relay coil 122'' through the relay switch 172e'' associated with the control unit 146'' so that the relay coil 122' will operate upon demand received by the control unit 146''. It will therefore be apparent, that the foregoing arrangement will insure that operation of all of the control units will continue even though two out of three of the control units malfunction.

Should there be any power failure, all of the relay switches will of course resume their normal positions corresponding to the deenergized condition of their associated relay coils. When power is restored, the relay coil 194 will be immediately energized since the deenergized relays 172, 172' and 172'' of the control units will have released their associated relay switches 172d, 172d' and 172d'' to their normally closed positions. The relay coil 194 is slow to release so that before it is deenergized by opening of one of the relay switches 172d, 172d' and 172d'', it will close its normally opened relay switches 194a, 194b and 194c in the respective control units in order to fully energize windings 176, 176' and 176'' in the relays 172, 172' and 172'' respectively insuring that the relay switches 172e, 172e' and 172e'' are displaced to their actuated positions before any demand for water is received by one of the control units. When the relays 172, 172' and 172'' are energized, their associated relay switches 172d, 172d' and 172d'' will open and restore the control units to control by the detector circuit upon opening of the relay switches 194a, 194b and 194c.

When the group select relay coil 196 is energized its normally opened relay switch 196b is closed in order to connect an audible alerting device such as the chimes 204 and the indicator lamp 206 across the D.C. voltage terminals 104 and 106 to provide a warning that watering is to begin. Closing of the relay switch 196b also completes an energizing circuit through a time delay relay coil 210 connected to the relay switch 196b through the normally closed relay switch 208b and connected to the D.C. voltage terminal 104 through the normally positioned relay switch 212a. After a preset period, the time delay relay coil 210 operates to close its normally opened relay switch 210a connecting the relay coil 208 across the D.C. voltage terminals 104 and 106 for energization thereof. When the relay coil 208 is energized, it opens the normally closed relay switch 208b in order to open the energizing circuit for the time delay relay 210 and at the same time closes the normally opened relay switch 208a in order to establish a holding circuit for the relay coil 208. Also upon energization of the relay coil 208, its normally opened relay switch 208c is closed to complete an energizing circuit for the valve control relay coil 124 which is operative to close the normally opened relay switch 124a associated therewith connecting the source of A.C. voltage to the valve control assemblies as hereinbefore described in connection with FIGURE 3a. It will therefore be apparent, that watering will begin after a predetermined delay following demand so as to warn persons in the vicinity before the watering valve opens. If this delay period is to be eliminated, switch 212 may be closed bypassing the time delay relay switch 210a so that the relay coil 208 may be immediately energized upon closing of the relay switch 196b to promptly begin the watering operation.

In order to prevent watering operation while it is raining, a moisture sensing element 214 is placed on the ground in such a position where it is isolated from water supplied by the watering system in order to detect the presence of rainfall. When rainfall is detected, a conductive path is established through the moisture sensor 214 in order to complete an energizing circuit through the relay coil 216 in series with a current adjusting potentiometer 218. The relay coil 216 when energized actuates its relay switch 216a which interrupts the energizing circuit for the time delay relay coil 210 and completes an energizing circuit through an indicator lamp 220 to signify that the control system is inoperative due to weather conditions. The action of the moisture sensor 214 is of course operative only when the manual switch 212 is opened. Further, in the event temperature conditions are such that watering is undesirable, a thermostat device 222 is provided in order to complete an alternative energizing circuit for the relay coil 216 for operation of the system as aforementioned in connection with the moisture sensor 214. Thus, operation of the system may be prevented because of weather conditions including precipitation and freezing temperatures.

In summary, the watering system described in connection with FIGURES 3a, 3b and 3c, involves a plurality of control units 146, 146' and 146'' each of which has a separate detector circuit responsive to a demand for watering from the area which it services to initiate a watering operation limited to the respective areas. Relay means is provided whereby watering cycles are begun in accordance with priority demands, each control unit awaiting completion of a water cycle in one area before watering begins in its associated area. Selectively operated switch means 126 is provided whereby the watering operation may be restricted to certain periods through a timer 134 or to either daylight or nighttime hours through a photocell relay device 136. Also, the watering operation may be automatically delayed for a predetermined period after a demand is made so that an alerting device may provide a warning. Indicators 182 and 184 are also provided in connection with each control unit to signify the moist or dry condition of the soil being serviced by the particular control unit. Also, an indicator 192 is provided with each control unit to indicate that it is awaiting the start of a watering cycle upon completion of the watering cycle of another control unit. Further, the system has facilities for its expansion in number of areas to be serviced by use of the group selector relay 196. The arrangement of the system also features facilities for automatic reset to prevent unreasonable delays in water low priority areas. Reset also occurs if there is any temporary power failure and operation of the system is continued as long as one of the control units thereof is in a proper functioning condition should the other control units malfunction. Facilities for adjusting the detector circuit associated with each of the control units is also provided so that the system may accommodate the different requirements of the respective areas being serviced.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an irrigation system, a control unit for operating a valve, comprising, a source of current a moisture detector, moisture sensing circuit means connected in series with said detector to the source for conducting a soil current reflecting the conductivity of the soil being serviced by the control unit, bias means connected to said source for conducting a bias current during flow of said soil current, signal means responsive to a predetermined reduction in said soil current relative to the bias current for establishing a demand signal, and operating means responsive to establishment of said demand signal for actuating said valve to begin an operational period.

2. The combination of claim 1 including meter means for comparatively measuring the soil and bias currents to monitor the condition of the soil and the control unit.

3. The combination of claim 2 including indicator means operatively connected to said signal means for indicating the absence of any demand signal.

4. The combination of claim 3 including delay means responsive to establishment of a demand signal to delay actuation of the valve for a warning period and alerting means connected to the delay means for establishing a warning signal during said warning period.

5. The combination of claim 4 including overruling means for selectively limiting operation of the valves to predetermined intervals of time and automatically preventing operation during adverse weather conditions.

6. The combination of claim 1 including indicator means operatively connected to said signal means for indicating the absence of any demand signal.

7. The combination of claim 1 including delay means responsive to establishment of a demand signal to delay actuation of the valve for a warning period and alerting means connected to the delay means for establishing a warning signal during said warning period.

8. The combination of claim 1 including overruling means for selectively limiting operation of the valve to predetermined intervals of time and automatically preventing operation during adverse weather conditions.

9. The combination of claim 1 including cycle regulating means operatively connected to said operating means for initiating the operational period of the valve upon receipt of the demand signal and preventing interruption thereof until the demand signal ceases.

10. In a system for irrigating a plurality of areas, control units associated with said areas for operating valves, each control unit comprising, a moisture detector, moisture sensing circuit means connected to said detector for conducting a soil current reflecting the conductivity of the soil in the area being serviced by the control unit, bias means for conducting a bias current during flow of said soil current, means responsive to a predetermined reduction in said soil current relative to the bias current for establishing a demand signal, operating means connected to all of the control units and responsive to establishment of a demand signal from one of said control units for actuating one of said valves to begin an operational period, meter means in each of said control units for comparatively measuring the soil and bias currents to monitor the condition of the soil and the control unit, and cycle regulating means operatively connected to said operating means for initiating the operational period of each of the valves upon receipt of the demand signal and preventing interruption of the operational period until the demand signal ceases.

11. The combination of claim 10 including unit selecting means operatively connected to the operating means for preventing simultaneous operation of more than one valve at a time, and means responsive to malfunction of any one of the control units for actuating the valve associated therewith in response to a demand signal from another of the control units.

12. In a system for irrigating a plurality of areas, control units associated with said areas for operating valves, each control unit comprising, a moisture detector, moisture sensing circuit means connected in series with said detector for conducting a soil current reflecting the conductivity of the soil in the area being serviced by the control unit, means responsive to a predetermined reduction in said soil current for establishing a demand signal, operating means responsive to establishment of a demand signal from one of said control units for actuating one of said valves to begin an operational period, priority establishing means connected to the moisture sensing circuit means of each of the control units for presetting the order in which said valves are operated one at a time by the operating means and cycle control means for preventing interruption of the operational periods once initiated until the initiating demand signals cease.

13. The combination of claim 12 including resetting means connected to the priority establishing means and responsive to establishment of demand signals in all of the control units for disabling the cycle control means preventing interruption of an existing operational period.

14. In an automatic control system for maintaining the moisture content of soil above a predetermined value comprising a source of DC current, a pair of electrodes, a pair of current sensing devices, one of said sensing devices being connected to one of the electrodes, current monitoring means connected in series with said electrodes and said one of the sensing devices establishing a soil current circuit, means for connecting the other of said sensing devices to the source for establishing a bias current circuit in parallel with the soil current circuit and relay means responsive to a predetermined difference in current through said sensing devices for establishing a demand signal.

15. The combination of claim 14 wherein said current sensing devices are opposed windings, said relay means including an armature displaceable by current flow through said windings, and a relay switch actuated by the armature to establish said demand signal.

References Cited
UNITED STATES PATENTS

| | | | |
|---|---|---|---|
| 2,611,643 | 9/1952 | Higgins | 239—64 |
| 2,721,101 | 10/1955 | Richard | 239—64 |
| 3,037,704 | 6/1962 | Kinigsberg et al. | 239—63 |
| 3,113,724 | 12/1963 | De Baugh | 239—63 |
| 3,182,914 | 5/1965 | Hosier | 239—63 |
| 3,195,816 | 7/1965 | Mercer | 239—63 |
| 3,224,676 | 12/1965 | Rauchwerger | 239—65 |
| 3,238,392 | 3/1966 | Richards | 239—63 |
| 3,297,254 | 1/1967 | Coffman | 239—64 |

EVERETT W. KIRBY, *Primary Examiner.*